US006957002B2

(12) United States Patent
Cottevieille et al.

(10) Patent No.: US 6,957,002 B2
(45) Date of Patent: Oct. 18, 2005

(54) METHOD OF MANUFACTURING AN OPTICAL FIBER HAVING COATINGS OF DISTINCT KINDS

(75) Inventors: Denis Cottevieille, Montreuil sous Bois (FR); Frédéric Cariou, Chilly Mazarin (FR); Xavier Andrieu, Bretigny sur Orge (FR)

(73) Assignee: Alcatel, Paris (FR)

( * ) Notice: Subject to any disclaimer, the term of this patent is extended or adjusted under 35 U.S.C. 154(b) by 150 days.

(21) Appl. No.: 10/720,259

(22) Filed: Nov. 25, 2003

(65) Prior Publication Data

US 2004/0105636 A1   Jun. 3, 2004

(30) Foreign Application Priority Data

Nov. 28, 2002  (FR) .................................. 02 14935

(51) Int. Cl.[7] ............... G02B 6/02; G02B 6/18
(52) U.S. Cl. ................ 385/128; 385/127; 385/123; 385/141; 427/162; 427/163.2
(58) Field of Search ................. 385/123, 126, 385/127, 128, 141; 427/162, 163.2

(56) References Cited

U.S. PATENT DOCUMENTS

| 4,690,503 A | 9/1987 | Janssen ...................... 385/123 |
| 4,778,244 A | 10/1988 | Ryan ........................... 385/123 |
| 4,906,066 A * | 3/1990 | Ryan ........................... 385/107 |
| 5,993,965 A * | 11/1999 | Flat et al. .................... 428/375 |
| 2005/0089297 A1 * | 4/2005 | Castellani et al. .......... 385/144 |

FOREIGN PATENT DOCUMENTS

EP   0 516 438 A1   12/1992

OTHER PUBLICATIONS

Patent Abstracts of Japan, vol. 010, No. 266, Sep. 11, 1986 corresponding to JP 6091610 A (Showa Electric Wire & Cable Co, Ltd) dated May 9, 1986.

Fumio Yamoto, "Jacketing of Optical fibers with Ordered Thermotropic Liquid Crystal Polyesters", Molecular Crystals and Liquid Crystals (Inc. Nonlinear Optics) Great Britain, vol. 153, No. Part A, Dec. 1, 1987, pp. 423-450 XP000000791.

* cited by examiner

Primary Examiner—Brian M. Healy
(74) Attorney, Agent, or Firm—Sughrue Mion, PLLC

(57) ABSTRACT

A method of coating an optical fiber constituted by a doped silica core (1) and by silica cladding (2) consists in surrounding the doped silica core (1) and the silica cladding (2) in coating constituted by a first coating portion (3) of photocurable resin and a second coating portion (4) made by extruding a thermoplastic polymer.

12 Claims, 1 Drawing Sheet

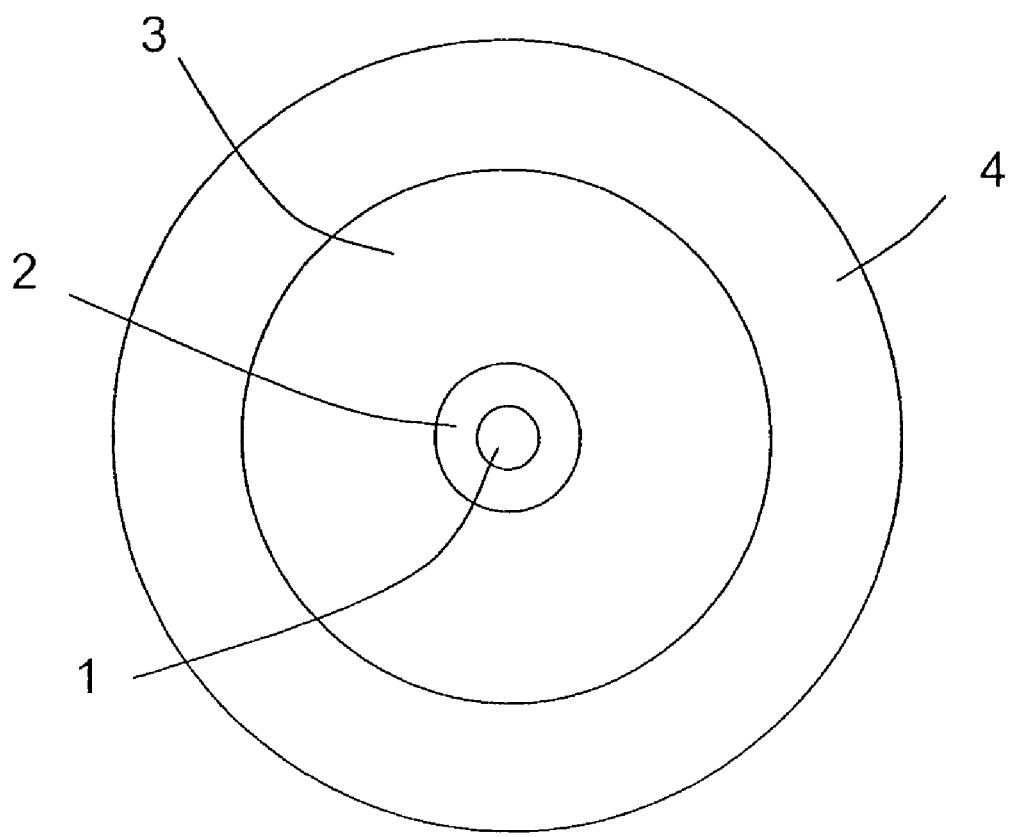
Figure unique

METHOD OF MANUFACTURING AN OPTICAL FIBER HAVING COATINGS OF DISTINCT KINDS

BACKGROUND OF THE INVENTION

The invention relates to the field of optical fibers.

Several methods have been developed for covering the core and cladding material of an optical fiber in a coating material to confer specific properties, for example robustness, flexibility, or protection against hostile environments.

Amongst those methods, proposals have been made in particular for a covering constituted by a first coating portion of photocurable resin having a low modulus of elasticity, generally having an acrylic base, and by a second coating portion having a high modulus of elasticity, generally being of the same kind as the first coating portion, and being intimately bonded therewith.

These photocurable resins present fast reaction kinetics in cross-linking, enabling speeds of about 2000 meters per minute (m/min) to be obtained. Nevertheless, such photocurable resins provide only a relatively narrow range of specific properties. In addition, since the resins need to be deposited by being applied at relatively low temperatures, typically 90° C., and since the temperature at which optical fibers are drawn is about 1600° C., it is imperative for the uncoated optical fiber to cool down considerably on leaving the fiber-drawing furnace, or in other words for the distance between the fiber-drawing furnace and the coating apparatus to be large. Finally, the cost of such photocurable resins is high.

Proposals have also been made to apply an additional coating, referred to as a "buffer" coating, to optical fibers already provided with identical first and second coating portions, the buffer coating being constituted by an extruded thermotropic liquid crystal polymer (TLCP). Such an optical fiber is described in particular in U.S. Pat. Nos. 4,778,244 and 4,906,066. That type of coating (or covering) enables certain specific properties of optical fibers to be reinforced, and in particular their ability to withstand external stresses induced by conditions during installation and/or use. However that is not sufficient, particularly given the wide variety of properties or characteristics that are required in numerous applications for optical fibers. In addition, the operation of adding the buffer coating takes place at a speed that is very slow, typically about 1 m/min to 10 m/min, which is very far from the usual speed at which optical fiber is manufactured.

SUMMARY OF THE INVENTION

The invention thus has the object of remedying the above-mentioned drawbacks in full or in part.

To this end, the invention provides a method of coating an optical fiber in which the material of the doped silica core and silica cladding is surrounded by a coating (or covering) constituted by a first coating portion of photocurable resin, e.g. based on acrylic, and by a second coating portion made by extruding a thermoplastic polymer. The thermoplastic polymer is mixed with an additive constituted by a thermotropic liquid crystal polymer.

The thermotropic liquid crystal polymer is preferably selected from the group constituted-by at least polyesters, and in particular completely aromatic polyesters and aromatic copolyesters.

The additive and the thermoplastic polymer are preferably prior mixed hot in the selected proportions so as to constitute an alloy. The proportion of additive is not more than about 10% by weight relative to the alloy, and preferably lies in the range about 2% to about 10%, and more preferably is equal to about 5%.

The thermoplastic polymer is preferably selected from polyethylene (PE), polyamide (PA), and in particular polyamide 12 (PA 12) such as Rilsan A®, for example ACNO TL® and AMMON P40TLD®.

The alloy is then preferably subsequently cooled and granulated. Thereafter the granules are preferably dried prior to being extruded, e.g. using an extruder having a tubing die.

The method of the invention is particularly, although not exclusively, adapted to coating optical fibers for telecommunications.

The present invention also provides an optical fiber constituted by a doped silica core and silica cladding, in which said core and said cladding are surrounded by a coating constituted by a first coating portion of photocurable resin and a second coating portion of thermoplastic polymer containing an additive constituted by a thermotropic liquid crystal polymer. The optical fiber is manufactured by the method of the invention.

BRIEF DESCRIPTION OF THE DRAWING

Other characteristics and advantages of the invention appear on examining the following detailed description and from the accompanying drawing in which the sole FIGURE is a diagrammatic cross-section view of an optical fiber obtained using a manufacturing method of the invention. The drawing may not only contribute to describing the invention, but it may also contribute to defining it, where appropriate.

DETAILED DESCRIPTION OF THE INVENTION

The invention relates to a method of coating an optical fiber constituted by a doped silica core 1 in which light propagates, and silica cladding 2. The method consists in covering the core 1 and the cladding 2 in a coating material comprising two portions 3 and 4.

A first portion 3 of the coating (or covering) surrounding the cladding 2 is made by applying a coating of a photocurable resin having a low modulus of elasticity. It is preferably an acrylic-based resin whose modulus of elasticity lies in the range about 1 megapascal (MPa) to about 10 MPa, and is more preferably equal to 1 MPa.

A second portion 4 of the coating (or covering) is made by extruding a meltable thermoplastic polymer around the layer forming the first portion 3. The polymer is selected as a function of required specific properties. By way of example, the thermoplastic polymer may be polyethylene (PE), polyamide (PA), and in particular polyamide 12 (PA 12) such as Rilsan A® (such as, for example ACNO TL® or AMMON P40TLD® sold by ATOFINA), or any other PA 12 of equivalent grade, such as for example, Ultramid® sold by BASF or Vestamid® sold by Degussa AG.

The extrusion temperature is selected as a function of the thermoplastic polymer used. Nevertheless, this temperature must be higher than the melting temperature of the thermoplastic polymer. Typically, it is possible to use temperatures lying in the range about 180° C. to about 330° C. This makes it possible to reduce significantly the distance needed for allowing the optical fiber to cool between the two coating operations.

The extruder is preferably fitted with a tubing die. Such a tubing die serves to provide coverings that are very fine, typically having thickness lying in the range about 20 micrometers (μm) to 100 μm, but without generating high pressures that are harmful for the fiber.

Furthermore, stripping can be performed using a conventional fiber stripper (a Miller® stripper).

By means of this method of manufacture, the cost of manufacturing optical fiber can be reduced by about 25% compared with the cost of manufacturing optical fibers in which the covering is constituted by two portions of the same kind made of photocurable resin, while obtaining a fiber having surface appearance that is equivalent, and a speed of manufacture that is substantially equivalent. In addition, it is possible to obtain good concentricity without significantly increasing signal attenuation.

In order to reduce the stresses to which the thermoplastic polymer is subjected during extrusion, such as, for example, shear stresses and draw-down ratio (DDR), i.e. the ratio between the section of the fiber leaving the extruder over the section of the coating, as induced mainly by the very high manufacturing speeds, it is advantageous to include an additive therein which acts as a lubricant, so as to constitute an alloy.

It may be a fluorine-containing additive, such as, for example, polytetrafluoroethylene (PTFE) or fluorinated ethylene propylene copolymer (FEP). However it is preferable to use a thermotropic liquid crystal polymer (TLCP) insofar as fluorine-containing additives can turn out to be poorly compatible with certain thermoplastic polymers, such as for electrical PA 12, and/or to be difficult to bond to the photocurable resin constituting the first portion 3 of the coating.

The TLCP is preferably selected from polyesters, and in particular polyesters that are totally aromatic, aromatic copolyesters, and in particular Vectra (sold by Hoechst Celanese), Vectra LKX 1110® and Vectra A 950®, and any other TLCP of equivalent grade including Zenite® (sold by E.I. Dupont de Nemours), Sumikasuper® and Ekonol® (sold by Sumitomo Chemical), Rodrun® (sold by Unitika), and Granlar® (sold by Grandmont).

The proportion of additive by weight within the alloy preferably lies in the range about 2% to about 10%. This proportion varies as a function of the type of thermoplastic polymer used and of the type of additive used. For example, it is possible to make an alloy comprising 95% PA 12 AMNO TLD® and 5% TCLP Vectra LKX 1110®. In this example, the percentages are by weight. Other examples of mixtures (or alloys) are to be found in the article by F. P. LaMantia in Liquid Crystal Polymer Blend, Technomic, Lancaster, USA, Chapter 4 (1993).

The alloy is preferably obtained hot prior to extrusion, for example using a two-screw mixer. The alloy is then cooled, preferably quickly, prior to being granulated. The granules are then preferably dried prior to being extruded as described above.

Such an alloy makes it possible, specifically, to optimize the rheological behavior of the thermoplastic polymer and to obtain high manufacturing speeds, typically of the order of 2000 m/min. In addition, TLCP reduces the melting enthalpy of the alloy, thus making it possible to simplify the cooling apparatus significantly. By virtue of its properties, the alloy passes from the liquid state to the solid state without requiring a large amount of heat to be extracted, thus enabling it to solidify in almost instantaneous manner.

The invention is not limited to the implementations of the method described above, merely by way of example, but it covers any variant that might be envisaged by the person skilled in the art within the ambit of the following claims.

Thus, in the above, an alloy is described made from a thermoplastic polymer and an additive, for example a thermotrophic liquid crystal polymer. However, it is possible to envisage that the alloy is constituted by a thermoplastic polymer and at least two different additives, such as, for example, different thermotropic liquid crystal polymers, thereby conferring specific properties thereto. It is also possible to envisage adding one or more dyes to the thermoplastic polymer with or without the additive.

What is claimed is:

1. A method of coating an optical fiber constituted by a doped silica core and silica cladding, in which said core and said cladding are surrounded by a coating constituted by a first coating portion of photocurable resin and a second coating portion made by extruding a thermoplastic polymer, said thermoplastic polymer having mixed therein an additive constituted by a thermotrophic liquid crystal polymer.

2. A method according to claim 1, in which said thermoplastic polymer is selected from the group comprising at least polyethylene and polyamide.

3. A method according to claim 2, in which said thermoplastic polymer is polyamide 12.

4. A method according to claim 1, in which said thermotrophic liquid crystal polymer is selected from the group comprising at least polyesters, and in particular completely aromatic polyesters, and aromatic copolyesters.

5. A method according to claim 1, in which said additive and said thermoplastic polymer are previously mixed hot in selected proportions in order to constitute an alloy.

6. A method according to claim 5, in which the concentration of said additive by weight is not greater than about 10% of the weight of the alloy.

7. A method according to claim 6, in which said concentration of additive, by weight, lies in the range about 2% to about 10% of the weight of the alloy.

8. A method according to claim 7, in which said alloy is cooled down and then granulated.

9. A method according to claim 8, in which said granules are dried prior to being extruded.

10. A method according to claim 1, in which said second portion of the coating is extruded using an extruder having a tubing die.

11. A method according to claim 1, in which said photocurable resin is acrylic based.

12. An optical fiber constituted by a doped silica core and silica cladding in which said core and said cladding are surrounded by a coating constituted by a first coating portion of photocurable resin and a second coating portion of thermoplastic polymer containing an additive constituted by a thermotropic liquid crystal polymer.

* * * * *